United States Patent
Tonami

(10) Patent No.: US 7,723,691 B2
(45) Date of Patent: May 25, 2010

(54) METHOD OF MANUFACTURING A RADIATION DETECTOR

(75) Inventor: Hiromichi Tonami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 12/299,433

(22) PCT Filed: Jun. 2, 2006

(86) PCT No.: PCT/JP2006/311079

§ 371 (c)(1),
(2), (4) Date: Nov. 3, 2008

(87) PCT Pub. No.: WO2007/141831

PCT Pub. Date: Dec. 13, 2007

(65) Prior Publication Data

US 2009/0072157 A1  Mar. 19, 2009

(51) Int. Cl.
*G01T 1/20* (2006.01)
(52) U.S. Cl. .................................. 250/367; 250/361 R
(58) Field of Classification Search ................. 250/362, 250/367, 368, 361 R
See application file for complete search history.

(56) References Cited

U.S. PATENT DOCUMENTS

| | | | |
|---|---|---|---|
| 7,067,814 B2 * | 6/2006 | Ooi | 250/368 |
| 7,355,180 B2 * | 4/2008 | Tonami et al. | 250/362 |
| 2004/0262527 A1 * | 12/2004 | Ooi | 250/368 |
| 2005/0104000 A1 * | 5/2005 | Kindem et al. | 250/361 R |
| 2005/0211906 A1 | 9/2005 | Tonami et al. | |

FOREIGN PATENT DOCUMENTS

| | | |
|---|---|---|
| JP | 06-337289 A | 12/1994 |
| JP | 2000-056023 A | 2/2000 |
| JP | 2002-090458 A | 3/2002 |
| JP | 2005-274526 A | 10/2005 |

OTHER PUBLICATIONS

International Search Report for the Application No. PCT/JP2006/311079 mailed Sep. 5, 2006.

* cited by examiner

*Primary Examiner*—David P Porta
*Assistant Examiner*—Mark R Gaworecki
(74) *Attorney, Agent, or Firm*—Cheng Law Group, PLLC

(57) ABSTRACT

In a method of manufacturing a radiation detector according to this invention, a lattice frame 40 is stored in a receptacle 50, and scintillators 1SF and 1SR are also stored therein. The lattice frame 40 and scintillators 1SF and 1SR are once taken out of the receptacle in a state of trial assembly as a two-stage scintillator block in trial assembly 54. The lattice frame 40 and scintillators 1SF and 1SR in trial assembly are stored in the receptacle 50 into which an optical binding material has been poured. This method can reduce trouble occurring in manufacture to realize a radiation detector simply.

10 Claims, 9 Drawing Sheets

METHOD OF MANUFACTURING A RADIATION DETECTOR

TECHNICAL FIELD

This invention relates to a method of manufacturing a radiation detector having scintillators, a light guide and light-sensitive elements optically coupled together in the stated order.

BACKGROUND ART

This type of radiation detector is used in a medical diagnostic apparatus such as a nuclear medical diagnostic apparatus (ECT: Emission Computed Tomography), e.g. a PET (Positron Emission Tomography) apparatus or a SPECT (Single Photon Emission Computed Tomography) apparatus, for detecting (simultaneously measuring) radiation (e.g. gamma rays) released from radioisotopes (RI) introduced into a patient and accumulated in a site of interest, and obtaining sectional images of RI distribution in the site of interest.

A PET apparatus will be described by way of example. The PET apparatus detects, with opposite gamma-ray detectors, two gamma rays released in directions of about 180° apart from a site of interest of a patient, and is constructed to reconstruct a sectional image of the patient when these gamma rays are detected simultaneously (counted simultaneously). The gamma-ray detectors used in the PET apparatus for simultaneously counting the gamma rays may have scintillators that emit light in response to incident gamma rays released from the patient, and light-sensitive elements (e.g. photomultiplier tubes) for converting the light emitted from the scintillators to electric signals.

FIG. 10 is an outline view of a conventional example. A radiation detector 110 includes a two-stage scintillator block 101 having a scintillator array of two-stage structure, for example. This two-stage scintillator block 101 is formed of a scintillator array upper part 111F and a scintillator array lower part 111R. The scintillator array upper part 111F and scintillator array lower part 111R are manufactured separately, and have an adhesive layer 102 interposed to bond the two parts finally. Thus, the radiation detector 110 includes the scintillator array upper part 111F and scintillator array lower part 111R, a light guide 120 optically coupled to the two-stage scintillator block 101, and four photomultiplier tubes 131, 132, 133 and 134 optically coupled to this light guide 120.

The scintillator array upper part 111F and scintillator array lower part 111R have two-dimensional close arrangements of scintillators 101SF and scintillators 101SR divided by light reflex materials 112 inserted in between. In the embodiment described hereinafter and in FIG. 10, the scintillators are arranged three-dimensionally; eight in X-direction, eight in Y-direction, and two stages in Z-direction, and thus a total of 128 (=8×8×2). The light guide 120 has a light guide lattice frame (not shown) which is a combination into a lattice form of strips (not shown) formed of optical elements such as light reflex materials. This light guide lattice frame defines numerous cubicles.

A specific method of manufacturing the two-stage scintillator block 101 is as follows. (1) First, when manufacturing the scintillator array upper part 111F, a lattice frame is prepared by combining a plurality of plate-like optical elements conforming to the height (the length in the direction of depth of gamma ray incidence) of the scintillators 101SF. (2) Before storing the lattice frame in a receptacle that can store the lattice frame, a transparent optical binding material is poured into that receptacle. (3) The scintillators 101SF are stored after storing the lattice frame in the receptacle, and the optical binding material is allowed to harden in this state. (4) The scintillator array upper part 111F having the hardened optical binding material, lattice frame and scintillators integrated together is taken out of the receptacle, and its outer shape is adjusted, whereby the scintillator array upper part 111F is manufactured. (5) The scintillator array lower part 111R also is manufacture by the same method as (1)-(4), and the two parts are bonded by the adhesive layer 102.

The principle of detection by the two-stage scintillator block 101 will now be described with reference to FIGS. 11 and 12. FIGS. 11 and 12 are explanatory views concerning identification of radiation detection in conventional examples. In FIGS. 11 and 12, reference RI denotes a radiation source, reference W denotes spaces (pitch) between the scintillators, and references $L_1$ and $L_2$ denote parallax errors. In principle, gamma rays released from positions distant from a visual field center often obliquely enter the scintillators of radiation detectors (radiation detectors $D_3$, $D_4$ in FIG. 11 and radiation detectors $MD_3$, $MD_4$ in FIG. 12).

As shown in FIG. 11, radiation detectors D having scintillators not divided in the direction of depth of gamma ray incidence not only detect a correct position but also detect an incorrect position (see the shaded portions in FIG. 11). That is, the view error becomes large gradually from the visual field center toward peripheries, and sectional images obtained with the PET apparatus are inaccurate.

On the other hand, as shown in FIG. 12, radiation detectors MD having scintillators divided in the direction of depth of gamma ray incidence provide the following functions and effects. That is, attenuation time of the emission pulse of light produced from incident gamma rays will be described with reference to radiation detectors MD having scintillators divided such that the scintillator array with the shorter attenuation time (scintillator array upper part 111F in FIG. 10) lies on the gamma ray incidence side, and the scintillator array with the longer attenuation time (scintillator array lower part 111R in FIG. 10) on the photomultiplier tube side (i.e. the side reverse of the gamma ray incidence side). In the case of these radiation detectors MD, improvement is sought to detect positions of emitted gamma rays accurately (see the shaded portions in FIG. 12) and obtain sectional images with increased accuracy even when gamma rays obliquely enter the scintillators of the radiation detectors MD (see Patent Documents 1 and 2, for example).

The gamma ray positions of the scintillator array with the short attenuation time and the scintillator array with the long attenuation time, stacked in the direction of depth of gamma ray incidence are specifically detected and identified as follows. As shown in FIG. 13, use is made of analog signals SF (signals of the scintillator array with the short attenuation time) or analog signals SR (signals of the scintillator array with the long attenuation time) which are electric signals outputted from the photomultiplier tubes which are the light-sensitive elements. Integration values of digital signals are calculated as shown in FIG. 14.

In FIG. 14, $T_1$ refers to an intermediate time at an intermediate point from emission start to emission end of emission pulse produced in the scintillator block, $A_{T1}$ refers to an intermediate additional value which is a sum of digital signals A from the emission start to the intermediate time $T_1$, $B_{T1}$ refers to an intermediate additional value which is a sum of digital signals B from the emission start to the intermediate time $T_1$, $T_2$ refers to the emission end, $A_{T2}$ refers to a total additional value which is a sum of digital signals A from the emission start to the emission end $T_2$, and $B_{T2}$ refers to a total additional value which is a sum of digital signals B from the emission start to the emission end $T_2$. In FIG. 14, reference A denotes an integration value of digital signals resulting from A/D conversion of analog signals SF (signals of the scintillator array with the short attenuation time), and reference B denotes an integration value of digital signals resulting from A/D conversion of analog signals SR (signals of the scintillator array with the long attenuation time).

The PET apparatus has an A/D converter, an adding device, a threshold calculating device, a mean value calculating device and a discriminating device (none being shown). The A/D converter converts the analog signals SF or analog signals SR shown in FIG. 13 into digital signals. The adding device successively adds the digital signals converted by the A/D converter. The addition by the adding device obtains the above intermediate additional value $A_{T1}$ or intermediate additional value $B_{T1}$, and the total additional value $A_{T2}$ or total additional value $B_{T2}$, respectively. The threshold calculating device calculates values $A_{T1}/A_{T2}$ or $B_{T1}/B_{T2}$ which is the intermediate additional value $A_{T1}$ or intermediate additional value $B_{T1}$ divided by the total additional value $A_{T2}$ or total additional value $B_{T2}$. This $A_{T1}/A_{T2}$ or $B_{T1}/B_{T2}$ is shown as threshold value. The mean value calculating device calculates mean value K from a maximum and a minimum of the threshold values calculated by the threshold calculating device. The discriminating device discriminates whether the threshold values calculated by the threshold calculating device are larger or smaller than the mean value K, thereby to detect and identify a gamma ray position.

[Patent Document 1]
Unexamined Patent Publication H6-337289 (pages 2-3, FIG. 1)

[Patent Document 2]
Unexamined Patent Publication No. 2000-56023 (pages 2-3, FIG. 1)

DISCLOSURE OF THE INVENTION

Problem to be Solved by the Invention

However, the conventional radiation detectors noted above have the following drawbacks. The optical elements (e.g. light reflex materials) forming the lattice frame are in the form of thin film-like plates. When the lattice frame is stored in the receptacle into which the transparent optical binding material has been poured, adjoining optical elements can adhere to each other, whereby the shape of the lattice frame fails to be fixed. This poses a problem in manufacture of scintillator arrays, and thus manufacture of radiation detectors. Besides, by storing the lattice frame in the receptacle, the lattice frame becomes hidden by the receptacle, making it impossible to check whether trouble has occurred with manufacture of scintillator arrays. Therefore, trouble is found only after manufacture or after use of radiation detectors, resulting in a problem of reduced throughput also.

Further, after the two-stage scintillator block 101 having the hardened optical binding material, lattice frame and scintillator integrated together is taken out of the receptacle serving as a jig required for assembly, the hardened optical binding material remains adhering to the receptacle. The optical binding material must therefore be removed for manufacture of a next scintillator array. This requires working hours corresponding to the number of scintillator arrays, resulting in expensive products.

In the case of two-stage scintillator block 101 shown in FIG. 10, in particular, the scintillator array upper part 111F and scintillator array lower part 111R are manufactured separately, and the two parts are finally bonded by the adhesive layer 102. This requires a great number of light reflex material parts, and numerous man-hours for assembly, resulting in expensive products.

Further, when bonding the scintillator array upper part 111F and scintillator array lower part 111R manufactured, each of the scintillator array upper 111SF and scintillator array lower 111SR is not necessarily be bonded as completely free from displacement. With any error, mapping cannot be effected accurately, thereby failing to maintain high image quality with high resolution.

This invention has been made having regard to the state of the art noted above, and its object is to provide a method of manufacturing radiation detectors, which is simply realizable with reduced trouble occurring in manufacture.

Means for Solving the Problem

To fulfill the above object, this invention provides the following construction.

A method of manufacturing a radiation detector according to this invention is a method of manufacturing a radiation detector including scintillator groups having a plurality of scintillators in a two-dimensional close arrangement, a light guide optically coupled to the scintillator group, and a plurality of light-sensitive elements optically coupled to the light guide and smaller in number than the scintillator groups, said method comprising (1) a step of preparing a lattice frame by combining a plurality of plate-like optical elements into a lattice form; (2) a step of storing the lattice frame in a receptacle capable of storing the lattice frame, and further storing scintillators, to form a trial assembly, and taking the lattice frame and the scintillators once out of the receptacle in the state of trial assembly; (3) a step of pouring an optical binding material into the receptacle before storing the lattice frame and scintillators in the trial assembly in the receptacle; (4) a step of storing the lattice frame and the scintillators in the trial assembly in the receptacle; (5) a step of allowing for adhesion and hardening in this state; and (6) a step of taking out of the receptacle a scintillator block integrating the optical binding material hardened, the lattice frame and the scintillators, and adjusting a contour thereof to complete the scintillator block.

In the method of manufacturing a radiation detector according to this invention, the manufacture through steps (1)-(5) can arrange the optical elements in the scintillator groups without cutting such as with a dicing saw or wire saw, and can realize a radiation detector simply and with high processing accuracy. In step (2), the lattice frame is stored and the scintillators are stored in the receptacle, and the lattice frame and the scintillators are once taken out of the receptacle in the state of trial assembly. Thus, the shape of the lattice frame is fixed by the scintillators stored, and the shape of the lattice frame and scintillators can be fixed in the state of trial assembly. In step (4), the lattice frame and scintillators in the trial assembly are stored in the receptacle into which an optical binding material has been poured. Therefore, the shape is hardly deformable from the state of trial assembly. This reduces trouble occurring with the manufacture of the scintillator groups, and thus with the manufacture of the radiation detector. Thus, with little chance of trouble occurring in manufacture, the radiation detector is realized simply.

In the invention described above, it is preferable that, before step (2) above, a film is laid along a recess of the receptacle for storing the lattice frame; step (2) above is executed to store the lattice frame in the receptacle so as to be nipped by the film laid therein, store the scintillators, and take the lattice frame and the scintillators once out of the receptacle in the state of trial assembly along with the film; step (4) above is executed to store the lattice frame and the scintillators in the trial assembly in the receptacle along with the film, and before step (5) above, only the film is pulled out of the receptacle.

Before step (2), a film is laid along a recess of the receptacle for storing the lattice frame; and step (2) is executed to store the lattice frame in the receptacle so as to be nipped by the film laid therein, store the scintillators, and take the lattice frame and the scintillators once out of the receptacle in the state of trial assembly along with the film. Thus, the shape of the lattice frame is fixed by the scintillators stored, and also the shape of the lattice frame is fixed by being nipped by the film. Therefore, the lattice frame and the scintillators can be fixed stably in the state of trial assembly. In step (4), the lattice frame and the scintillators in the trial assembly are stored in the receptacle along with the film. Before step (5) above, only the film is pulled out of the receptacle. As a result, the shape is further stabilized in and hardly deformable from the state of trial assembly. There is a further reduced chance of trouble occurring with the manufacture of the scintillator groups, and thus with the manufacture of the radiation detector.

Where nipping is provided by the film, it is further preferable to carry out the manufacture as follows. Step (2) is executed to store the lattice frame in the receptacle so as to be nipped by the film, store the scintillators, then apply an adhesive tape to an upper surface of the trial assembly, and take the lattice frame and the scintillators once out of the receptacle in the state of trial assembly along with the film and the adhesive tape; step (4) is executed to store the lattice frame and the scintillators in the trial assembly in the receptacle along with the film and the adhesive tape, and before step (5), the adhesive tape is removed from the upper surface and only the film is pulled out of the receptacle.

In step (2), the lattice frame is stored in the receptacle so as to be nipped by the film, the scintillators are stored, then an adhesive tape is applied to the upper surface of the trial assembly, and the lattice frame and the scintillators are once taken out of the receptacle in the state of trial assembly along with the film and the adhesive tape. Thus, the shape of the lattice frame is fixed by the scintillators stored, the shape of the lattice frame is fixed by being nipped by the film, and also the shape of the lattice frame is fixed by the adhesive tape applied to the upper surface of the trial assembly. Therefore, the lattice frame and the scintillators can be fixed further stably in the state of trial assembly. In step (4), the lattice frame and the scintillators in the trial assembly are stored in the receptacle along with the film and adhesive tape. Before step (5) above, the adhesive tape is removed from the upper surface and only the film is pulled out of the receptacle. As a result, the shape is further stabilized in and hardly deformable from the state of trial assembly. There is a further reduced chance of trouble occurring with the manufacture of the scintillator groups, and thus with the manufacture of the radiation detector.

Where nipping is provided by the film and the adhesive tape is applied to the upper surface, it is further preferable to carry out the manufacture as follows. It is further preferable that step (2) above is executed to apply the adhesive tape also to the film when applying the adhesive tape to the upper surface of the trial assembly. By applying the adhesive tape also to the film when applying the adhesive tape to the upper surface of the trial assembly, the film can nip the lattice frame with increased assurance.

In the invention described above, it is preferable that step (4) above is executed to drip an optical binding material to fill gaps between the scintillators and the lattice frame and gaps between the scintillators after storing the lattice frame and the scintillators in the trial assembly in the receptacle. The dripping can prevent voids forming in the gaps between the scintillators and lattice frame or gaps between scintillators, thus preventing lowering of resolution due to the voids.

It is still more desirable to carry out vacuum degassing while dripping the optical binding material. The vacuum degassing can prevent voids forming in the hardened optical binding material, and can prevent lowering of resolution due to the voids. As a result, it is possible to improve discriminating performance and to maintain high image quality with high resolution.

In one example of the invention described above, a length in a direction of depth of radiation incidence of the scintillators to be stored in step (2) is made shorter than a length in the direction of depth of radiation incidence of the lattice frame; and step (2) is executed to store the lattice frame in the receptacle, store the respective scintillators as divided into a plurality in the direction of depth of radiation incidence, equalize a total length in the direction of depth of radiation incidence of the scintillators stored as divided into the plurality and the length in the direction of depth of radiation incidence of the lattice frame, and take the lattice frame and the scintillators once out of the receptacle in the state of trial assembly.

According to this example, the length in the direction of depth of radiation incidence of the scintillators to be stored in step (2) is made shorter than the length in the direction of depth of radiation incidence of the lattice frame; and step (2) is executed to store the lattice frame in the receptacle, store the respective scintillators as divided into a plurality in the direction of depth of radiation incidence, equalize the total length in the direction of depth of radiation incidence of the scintillators stored as divided into the plurality and the length in the direction of depth of radiation incidence of the lattice frame, and take the lattice frame and the scintillators once out of the receptacle in the state of trial assembly. By manufacturing in this way, the radiation detector is realized simply as having the scintillators divided in the direction of depth of radiation incidence.

By storing the scintillators as divided into a plurality in the direction of depth of radiation incidence, in the receptacle having the lattice frame stored therein, the scintillators can be manufactured en bloc. Thus, the number of man-hours for assembly can be reduced to a fraction of the plurality. Since there is no need to bond the scintillators together, mapping can be carried out accurately with no displacement occurring between the scintillators. As a result, it is possible to improve discriminating performance and to maintain high image quality with high resolution.

This invention described above is particularly useful for manufacturing the radiation detector having the scintillators divided in the direction of depth of radiation incidence as in this example. That is, in the prior art, when a lattice frame formed of optical elements which are film-like thin plates is stored in a receptacle into which an optical binding material has been poured, the shape of the lattice frame is not fixed because of adjoining optical elements adhering to one another, for example. This causes trouble with manufacture of the group of scintillators, and thus manufacture of the radiation detector. Further, the number of man-hours for assembly corresponding to the number of divisions is required. This invention, when applied to the radiation detector having the scintillators divided in the direction of depth of radiation incidence, produces outstanding effects of reducing the number of man-hours for assembly and reducing trouble occurring with the manufacture.

In the example described above, it is preferable that the respective scintillators different in attenuation time are stored as divided into the plurality in the direction of depth of radiation incidence, so that an attenuation time of emission pulse generating from incident radiation increase from a radiation incidence side toward a side adjacent the light-sensitive elements. By using the difference in the attenuation time of emission pulse in this way, radiation is captured in the direction of depth of radiation incidence, and positions of the radiation can be detected and determined with high accuracy.

In an example further to the example described above, step (2) is executed to store the lattice frame in the receptacle, store the respective scintillators in two separate steps in the direction of depth of radiation incidence, equalize a total length in the direction of depth of radiation incidence of the scintillators stored in the two separate steps and the length in the direction of depth of radiation incidence of the lattice frame, and take the lattice frame and the scintillators once out of the receptacle in the state of trial assembly.

According to this example, step (2) is executed to store the lattice frame in the receptacle, store the respective scintillators in two separate steps in the direction of depth of radiation incidence, equalize a total length in the direction of depth of radiation incidence of the scintillators stored in the two separate steps and the length in the direction of depth of radiation incidence of the lattice frame, and take the lattice frame and the scintillators once out of the receptacle in the state of trial assembly. By manufacturing in this way, the radiation detector is realized simply as having the scintillators divided in the direction of depth of radiation incidence.

By storing the scintillators in two separate steps in the direction of depth of radiation incidence, in the receptacle having the lattice frame stored therein, the scintillators can be manufactured en bloc. Thus, the number of man-hours for assembly can be halved.

Considering detection and determination of positions of the radiation with high accuracy, in the further example described above, it is preferable that the scintillators with a shorter attenuation time are stored on a radiation incidence side, while the scintillators with a longer attenuation time are stored on a side adjacent the light-sensitive elements which is a side reverse of the radiation incidence side.

Effects of the Invention

In the method of manufacturing a radiation detector according to this invention, manufacture is carried out through steps (1)-(5), and in step (2), a lattice frame is stored and scintillators are stored in a receptacle, and the lattice frame and the scintillators are once taken out of the receptacle in a state of trial assembly. In step (4), the lattice frame and scintillators in the trial assembly are stored in the receptacle into which an optical binding material has been poured. Thus, with little chance of trouble occurring in manufacture, the radiation detector is realized simply.

DESCRIPTION OF REFERENCES

Figure 1:
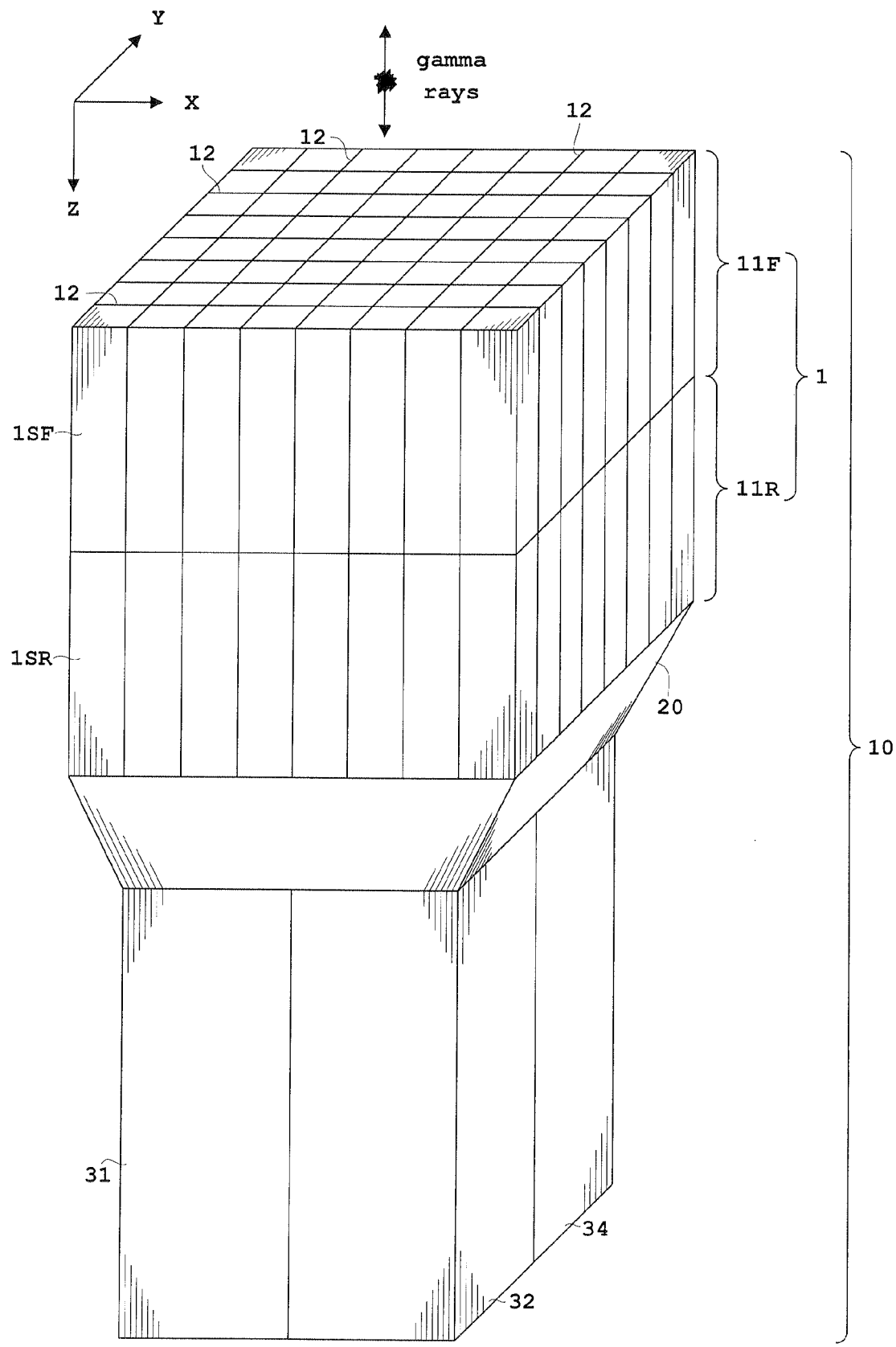
FIG. 1 is a view showing an outward appearance of a radiation detector according to this invention.

1 . . . two-stage scintillator block
1SF . . . scintillators (with a short attenuation time of emission pulse)
1SR . . . scintillators (with a long attenuation time of emission pulse)
10 . . . radiation detector
11F . . . scintillator array upper part
11R . . . scintillator array lower part
12 . . . light reflex materials
20 . . . light guide
31, 32, 33, 34 . . . photomultiplier tubes
40 . . . lattice frame
41, 42 . . . strips
50 . . . receptacle
51 . . . recess
52 . . . film
53 . . . adhesive tape
54 . . . two-stage scintillator block in trial assembly

EMBODIMENT

An embodiment of this invention will be described hereinafter with reference to the drawings. FIG. 1 is a view (perspective view) showing an outward appearance of a radiation detector according to this invention. As shown in FIG. 1, the radiation detector 10 includes a scintillator block 1 having a scintillator array of two-stage structure. This is a DOI (Depth Of Interaction) detector with scintillators arranged as divided also in a direction of depth of gamma ray incidence, that is with scintillators arranged three-dimensionally. With the DOI detector in this embodiment, the scintillator array has a two-stage structure. The two-stage scintillator block 1 is formed of a scintillator array upper part 11F and a scintillator array lower part 11R. In this embodiment, the scintillator array upper part 11F and scintillator array lower part 11R are manufactured simultaneously.

The scintillator array upper part 11F and scintillator array lower part 11R have a three-dimensional close arrangement of scintillators 1SF and scintillators 1SR divided by light reflex materials 12 inserted in between. In this embodiment, the light reflex materials 12 are formed integrally in the direction of depth of gamma ray incidence. The scintillator array upper part 11F and scintillator array lower part 11R are formed integrally by the light reflex materials 12. In this embodiment, the scintillators are arranged three-dimensionally; eight in X-direction, eight in Y-direction, and two stages in Z-direction, and thus a total of 128 (=8×8×2). A light guide 20 has a light guide lattice frame (not shown) which is a combination into a lattice form of strips (not shown) formed of light reflex materials (not shown). This light guide lattice frame defines numerous cubicles. Further, four photomultiplier tubes 31, 32, 33 and 34 are optically coupled to this light guide 20. The photomultiplier tubes 31, 32, 33 and 34 correspond to the light-sensitive elements in this invention.

The two-stage scintillator block 1 in particular has the scintillators 1SF and scintillators 1SR, and a lattice frame (see a lattice frame 40 in FIGS. 5, 8 and 9) which is a combination into a lattice form of strips (see strips 41, 42 in FIGS. 4 and 5) formed of plate-like optical elements (light reflex materials 12). This lattice frame is formed integrally in the direction of depth of gamma ray incidence.

The radiation detector 10 in this embodiment uses scintillators with a short attenuation time of emission pulse as the scintillators 1SF, and uses scintillators with a long attenuation time of emission pulse as scintillators 1SR. The scintillators with a short attenuation time of emission pulse are formed of an inorganic crystal such as $Gd_2SiO_5$: Ce1.5 mol % ($Gd_2SiO_5$ doped with Ce at 1.5 mol %, i.e. GSO1.5), $Lu_2SiO_5$: Ce ($Lu_2SiO_5$ doped with Ce, i.e. LSO) or $LuYSiO_5$: Ce ($LuYSiO_5$ doped with Ce, i.e. LYSO). On the other hand, the scintillators with a long attenuation time of emission pulse are formed of an inorganic crystal such as $Gd_2SiO_5$: Ce0.5 mol % ($Gd_2SiO_5$ doped with Ce at 0.5 mol %, i.e. GSO0.5), $Lu_{0.4}Gd_{1.6}SiO_5$: Ce (LGSO) or $Bi_4Ge_3O_{12}$ (BGO).

The two-stage scintillator block 1 consists in an optical combination of the two, scintillator array upper part 11F and scintillator array lower part 11R which differ in the attenuation time of emission pulse in the direction of depth of gamma ray incidence (Z-direction). The scintillator array upper part 11F comprises a two-dimensional close arrangement of a plurality of scintillators 1SF with a short attenuation time of emission pulse, and the scintillator array lower part 11R a plurality of scintillators 1SR with a long attenuation time of emission pulse. Specifically, the two-stage scintillator block 1 uses $Gd_2SiO_5$: Ce1.5 mol % ($Gd_2SiO_5$ doped with Ce at 1.5 mol %, i.e. GSO1.5), for example, as the scintillators 1SF with a short attenuation time of emission pulse on the gamma ray incidence side (forward stage), and uses $Gd_2SiO_5$: Ce0.5 mol % ($Gd_2SiO_5$ doped with Ce at 0.5 mol %, i.e. GSO0.5), for example, as the scintillators 1SR with a long attenuation time of emission pulse on the side adjacent the photomultiplier tubes 31, 32, 33 and 34 (rearward stage) which is the side reverse of the gamma ray incidence side.

The radiation detector 10 in this embodiment, as does a conventional example, determines places where gamma rays are captured in the direction of depth of gamma ray incidence, by using a difference between the attenuation times of emission pulse. Therefore, positions of gamma rays can be determined with high accuracy.

Figure 2:
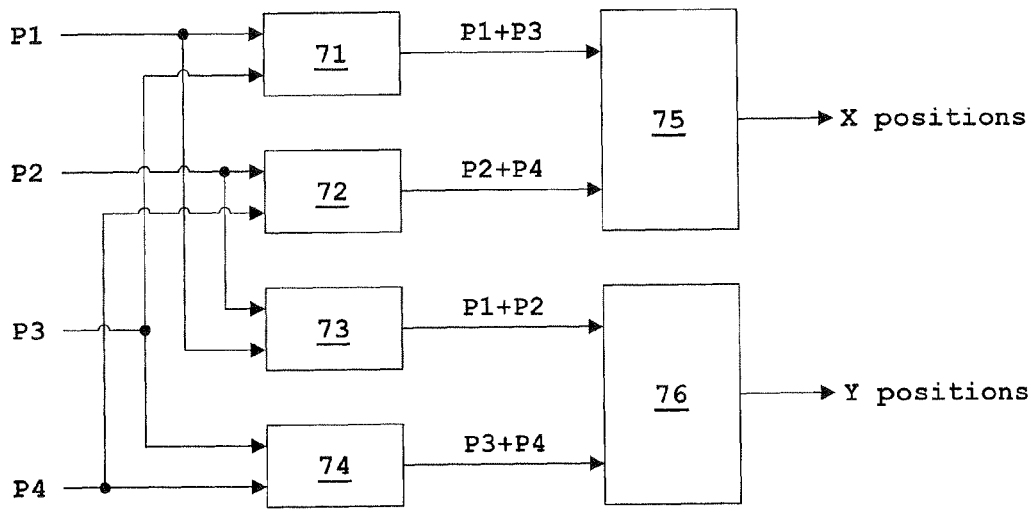
FIG. 2 is a block diagram showing a position calculating circuitry of the radiation detector.

A position coding map and energy spectrum when gamma rays are emitted from a front position to the radiation detector 10 having the scintillator array of two-stage structure as shown in FIG. 1, will be described. Assume, as shown in FIG. 2, that P1 is an output of the photomultiplier tube 31, P2 an output of the photomultiplier tube 32, P3 an output of the photomultiplier tube 33, and P4 an output of the photomultiplier tube 34. A calculated value $\{(P1+P3)-(P2+P4)\}/(P1+P2+P3+P4)$ representing a position in X-direction is calculated. Similarly for Y-direction, a calculated value $\{(P1+P2)-(P3+P4)\}/(P1+P2+P3+P4)$ representing a position in Y-direction is calculated.

Figure 3:
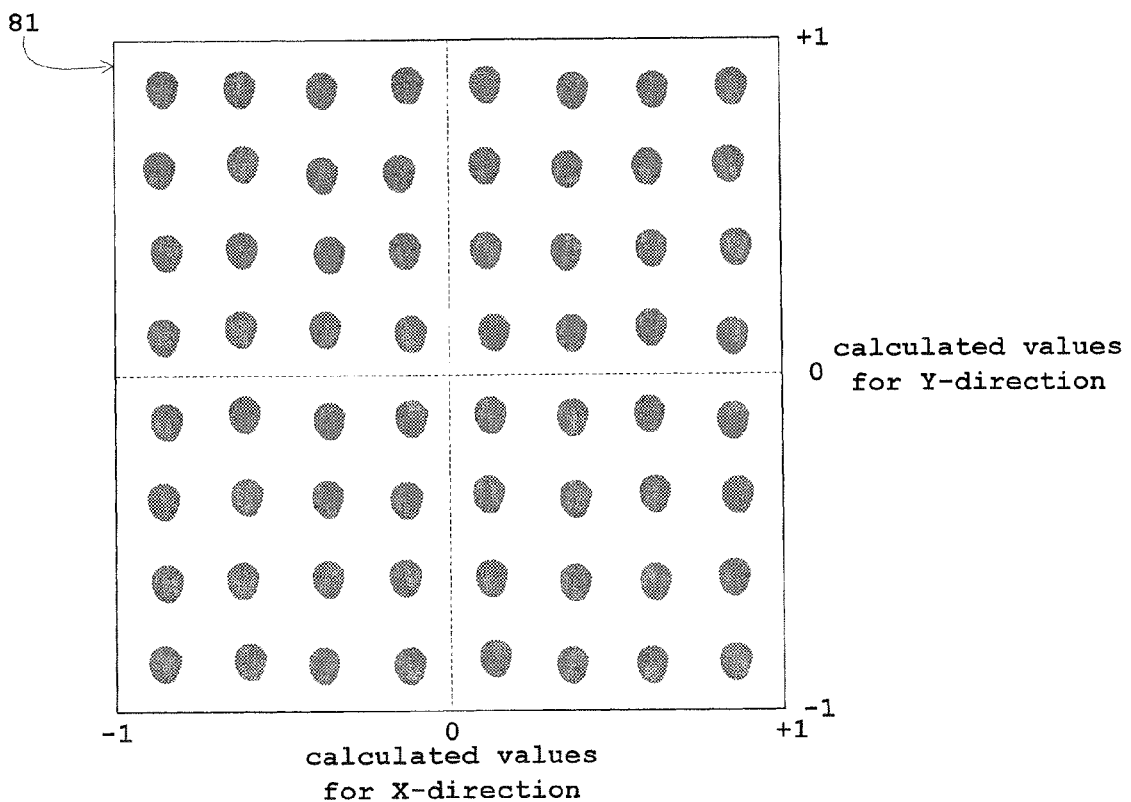
FIG. 3 is a position coding map of the radiation detector according to this invention and in a conventional example.

FIG. 2 is a block diagram showing a position calculating circuitry of the radiation detector 10. FIG. 3 is a position coding map of the radiation detector according to this invention and in a conventional example. The position calculating circuitry includes adders 71, 72, 73 and 74 and position discriminating circuits 75 and 76. As shown in FIG. 2, in order to detect positions of incidence of gamma rays in X-direction, output P1 of the photomultiplier tube 31 and output P3 of the photomultiplier tube 33 are inputted to the adder 71, and output P2 of the photomultiplier tube 32 and output P4 of the photomultiplier tube 34 are inputted to the adder 72. Added outputs (P1+P3) and (P2+P4) of the two adders 71 and 72 are inputted to the position discriminating circuit 75, and positions of incidence of gamma rays in X-direction are determined from the two added outputs.

Similarly, for detecting positions of incidence of gamma rays in Y-direction, added outputs (P1+P2) and (P3+P4) are inputted to the position discriminating circuit 76, and positions of incidence of gamma rays in Y-direction are determined from the two added outputs.

Results calculated as described above, after determining places where gamma rays are captured in the direction of depth of gamma ray incidence by using a difference between attenuation times of emission pulse, according to positions of gamma rays incident on the scintillators, are expressed as a position coding map 81 as shown in FIG. 3, presenting each position discrimination information.

Figure 4:
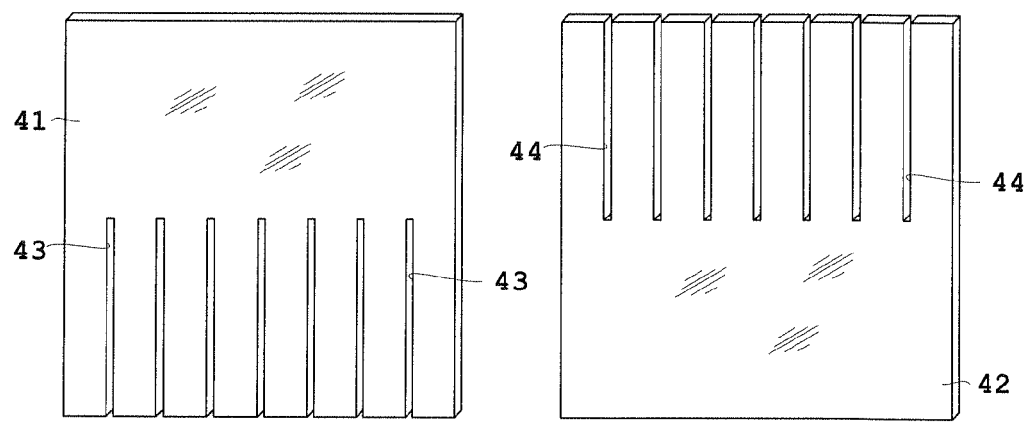
FIG. 4 is a view showing, in exploded perspective, optical elements constituting a lattice frame.
Figure 5:
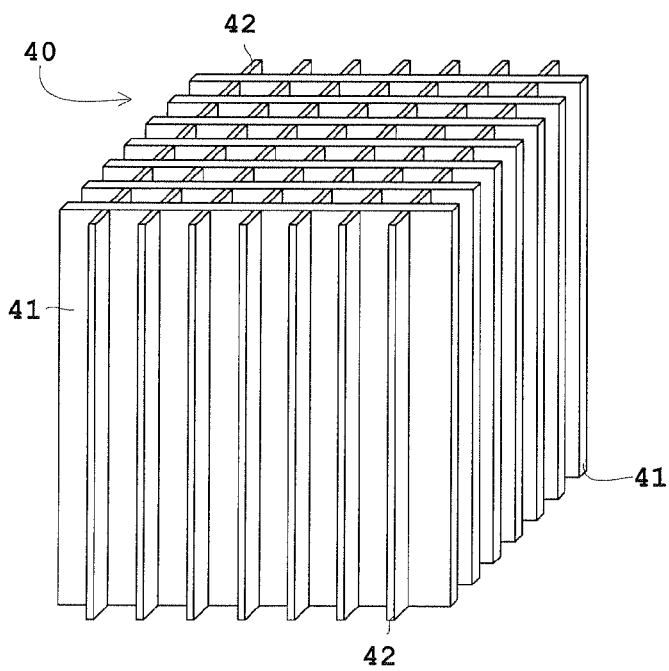
FIG. 5 is a perspective view of the lattice frame.
Figure 6:
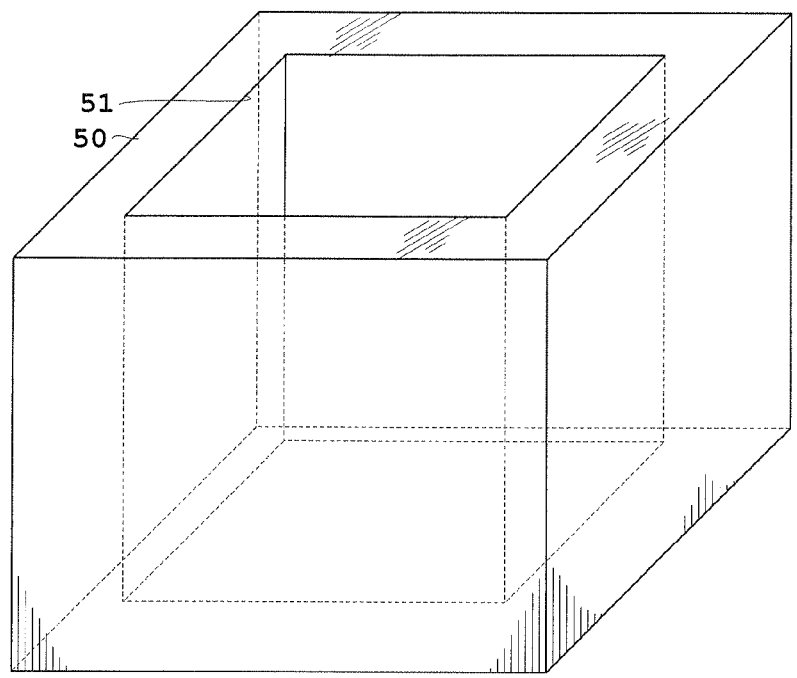
FIG. 6 is a perspective view of a receptacle for use in manufacture of the radiation detector.
Figure 7:
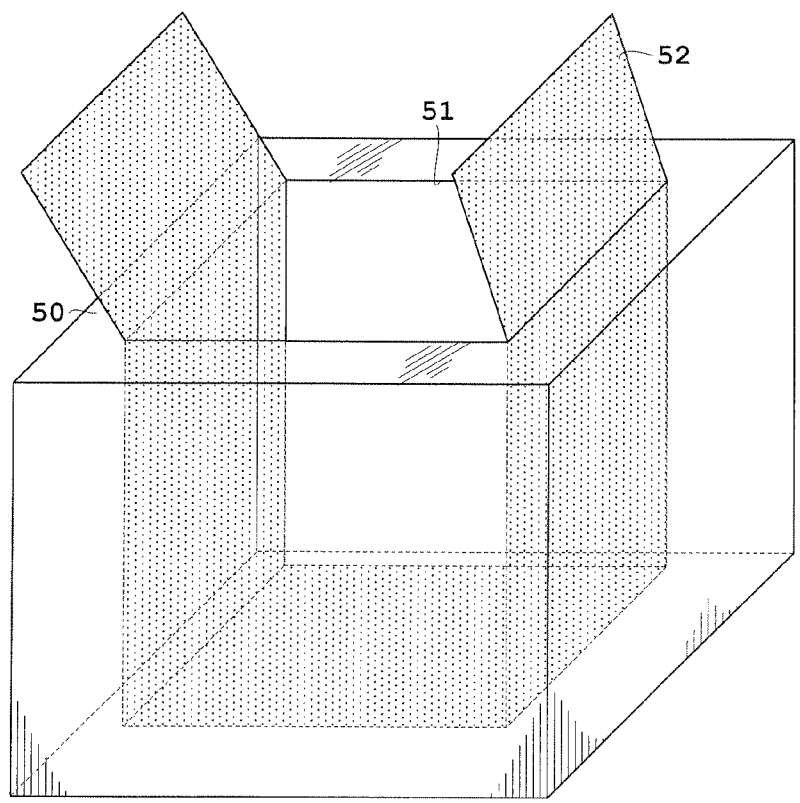
FIG. 7 is a view showing a step in a process of manufacturing the radiation detector according to this invention.
Figure 8:
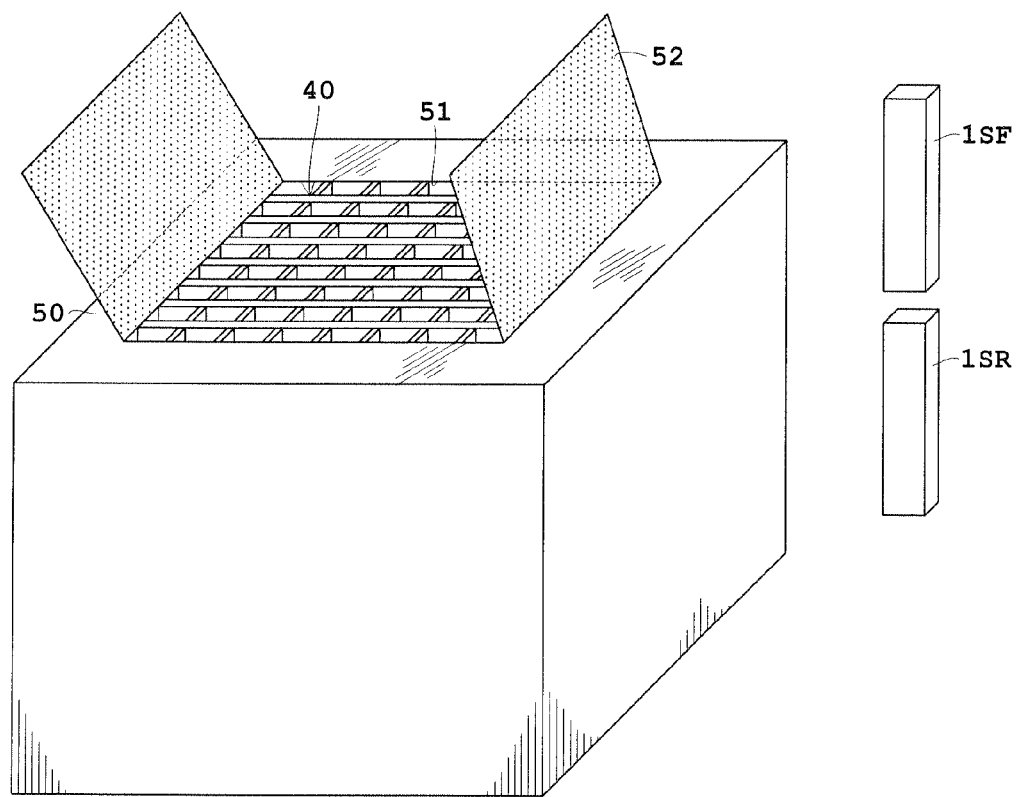
FIG. 8 is a view showing a step in the process of manufacturing the radiation detector according to this invention.
Figure 9:
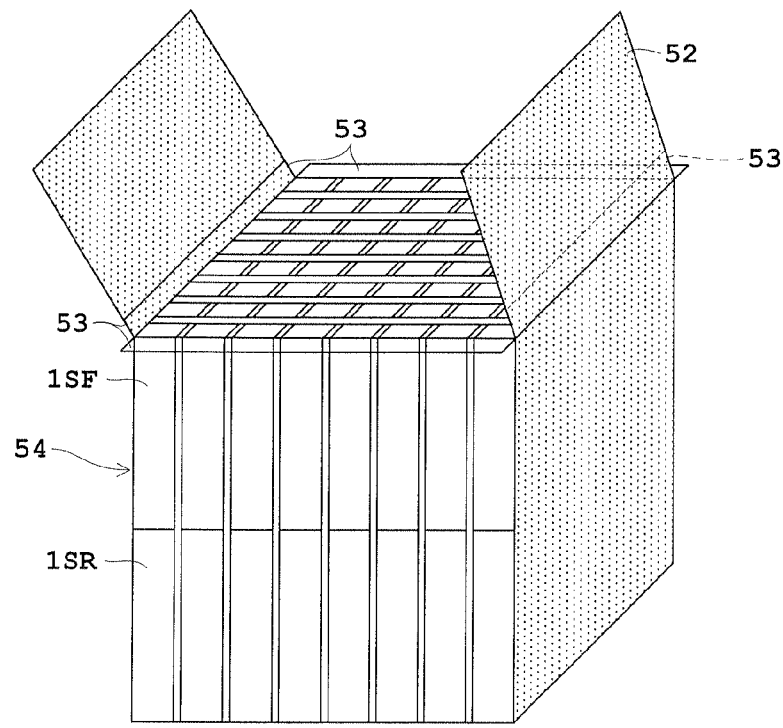
FIG. 9 is a view showing a step in the process of manufacturing the radiation detector according to this invention.
Figure 10:
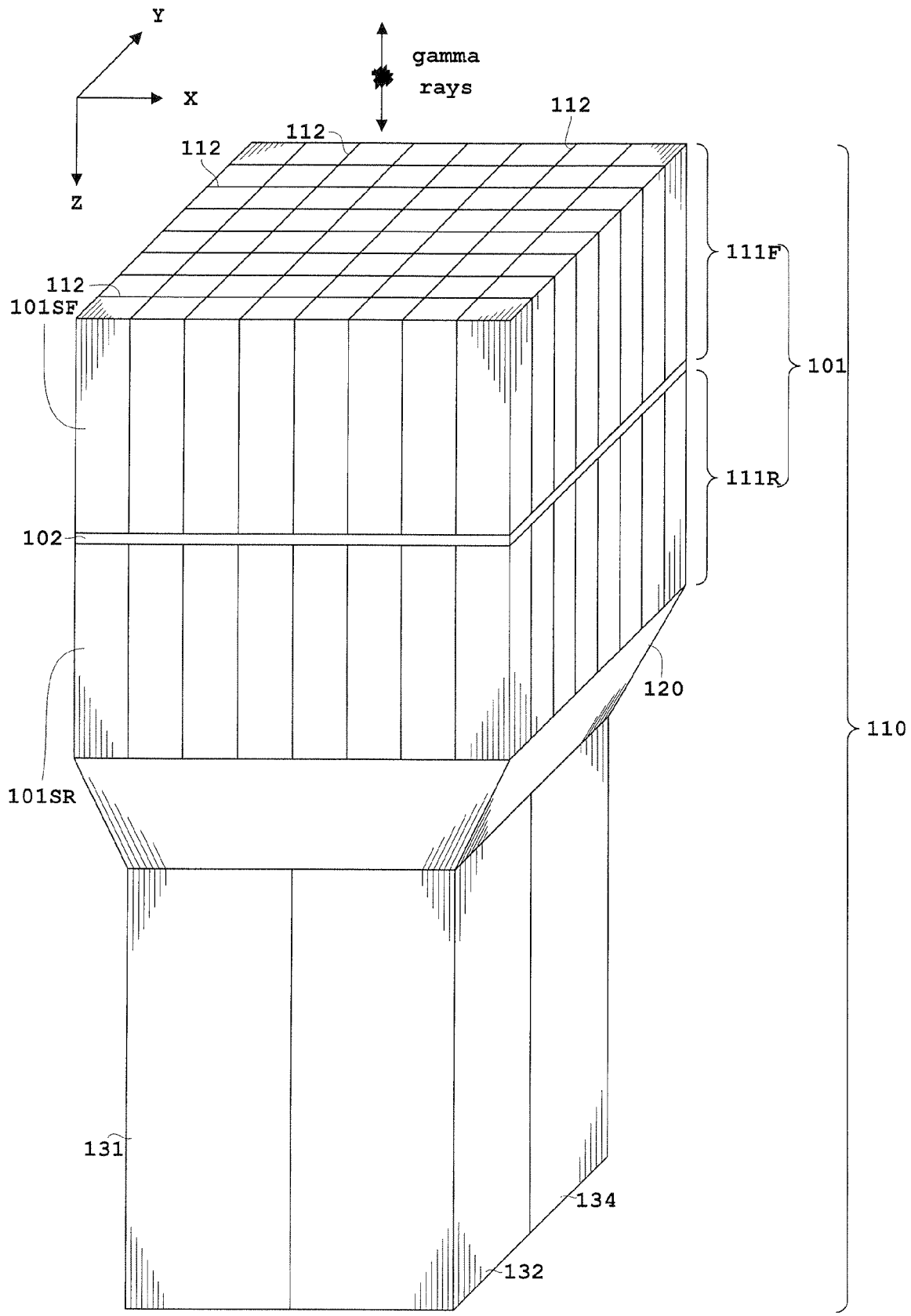
FIG. 10 is a view showing an outward appearance of a conventional radiation detector.
Figure 11:
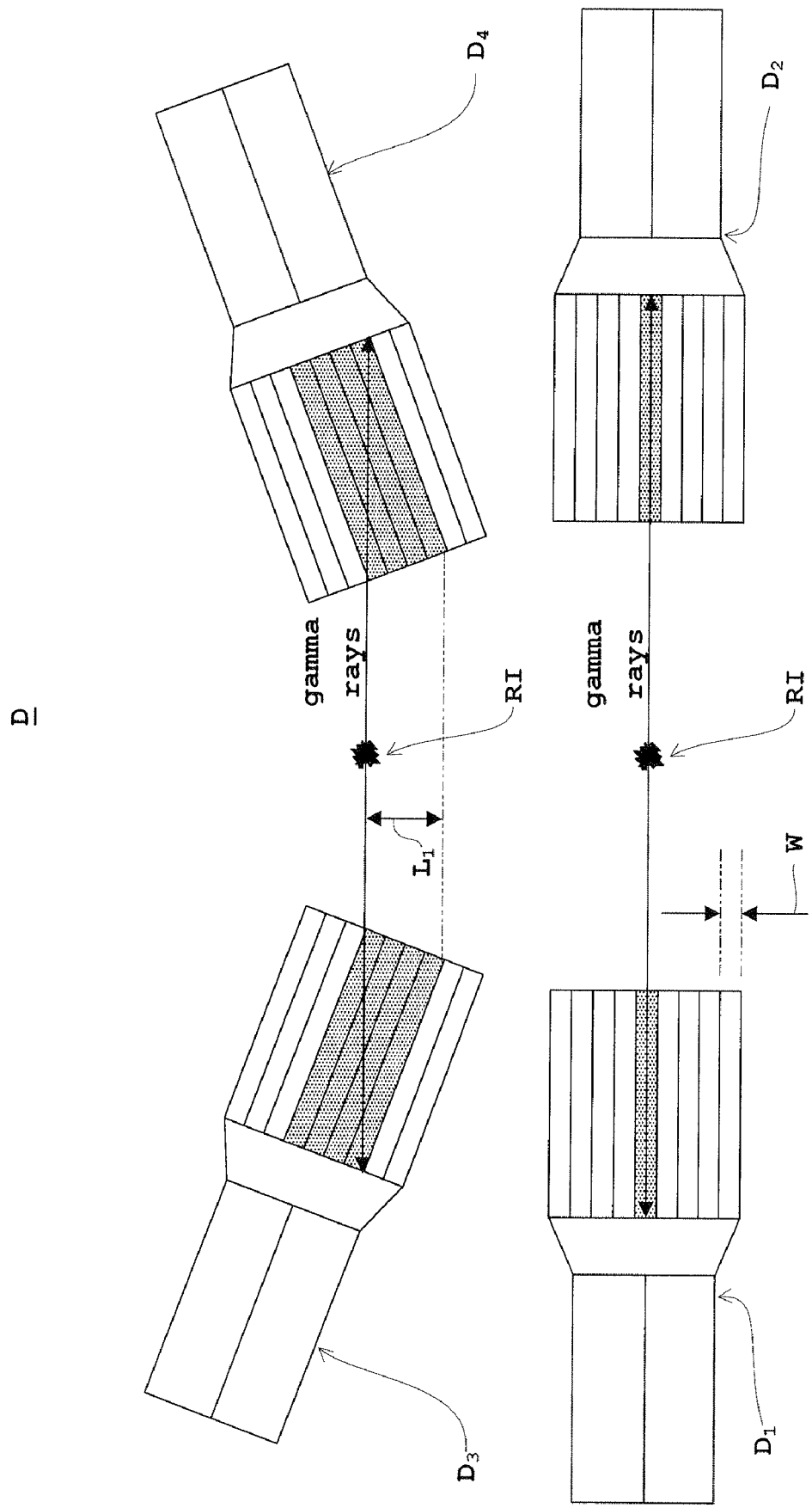
FIG. 11 is an explanatory view concerning identification of radiation detection of conventional examples.
Figure 12:
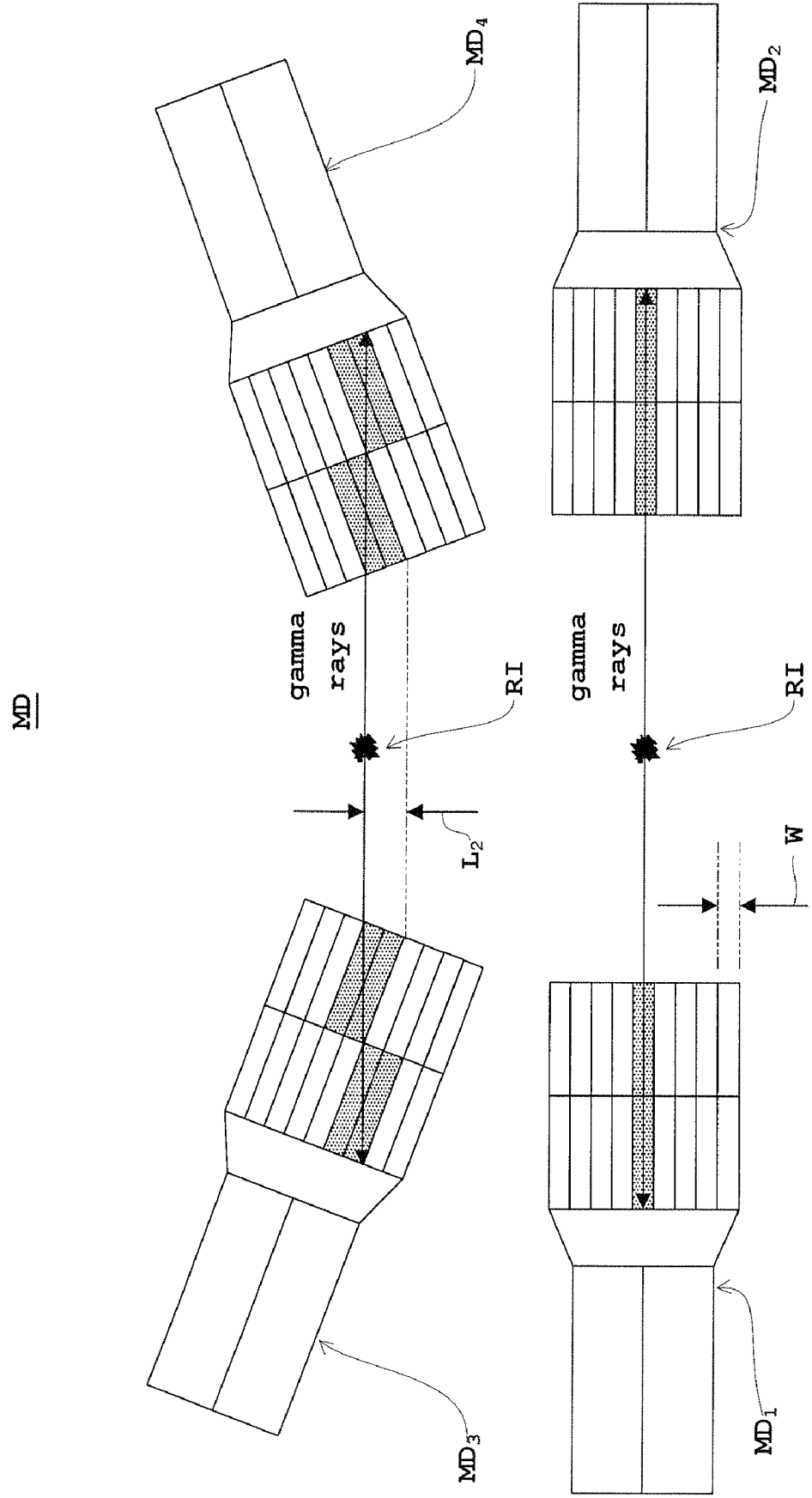
FIG. 12 is an explanatory view concerning identification of radiation detection of conventional examples.
Figure 13:
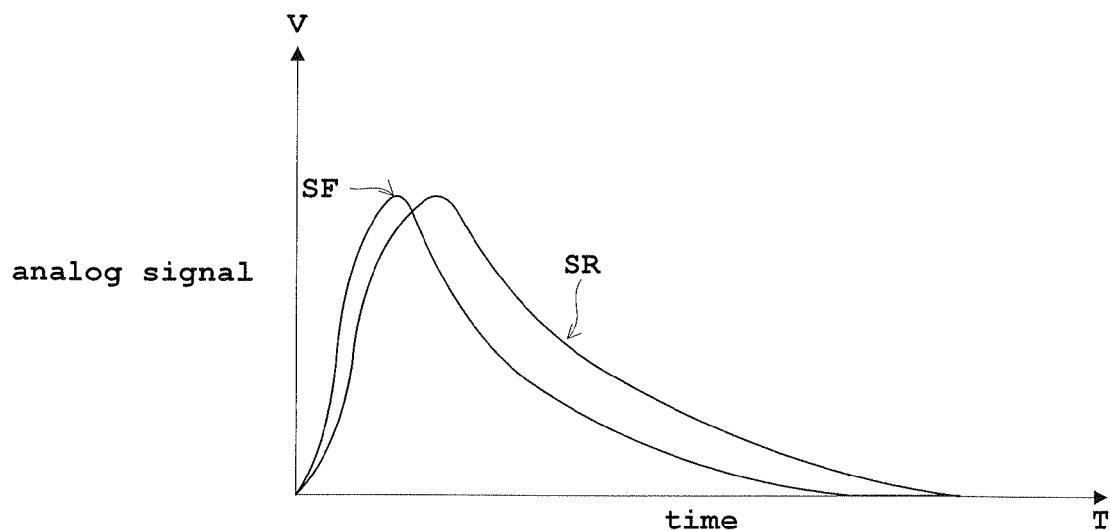
FIG. 13 is a graph showing analog signals which are electric signals outputted from photomultiplier tubes which are light-sensitive elements of conventional examples.
Figure 14:
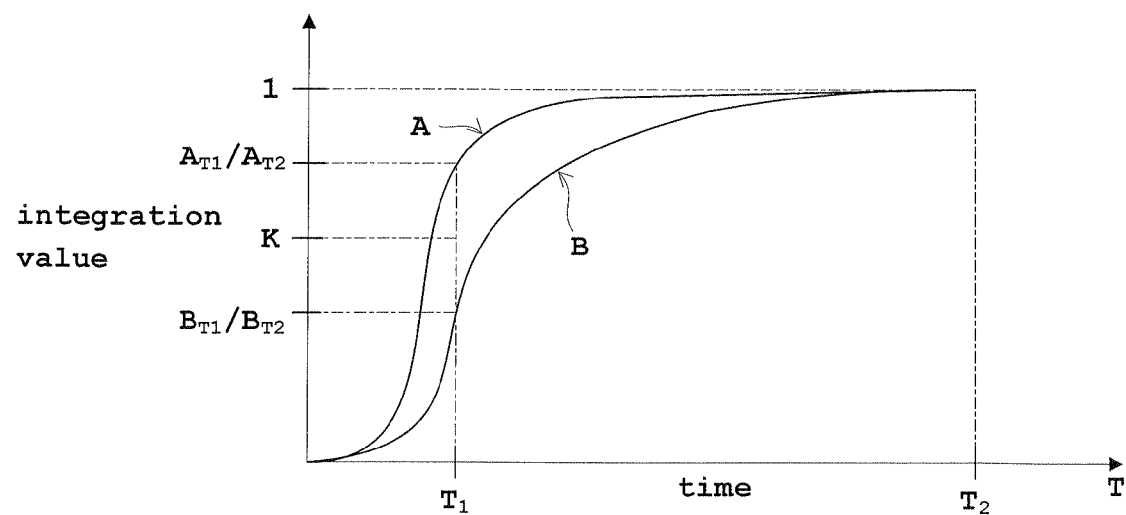
FIG. 14 is a graph showing a time series of an integration value of digital signals resulting from A/D conversion of the analog signals of conventional examples.

A method of manufacturing the two-stage scintillator block 1 in this embodiment will now be described with reference to FIGS. 4-9. FIG. 4 is a view showing, in exploded perspective, optical elements constituting the lattice frame. FIG. 5 is a perspective view of the lattice frame. FIG. 6 is a perspective view of a receptacle for use in manufacture of the radiation detector. FIGS. 7-9 are views showing steps in a process of manufacturing the radiation detector in this embodiment. Strips 41 and 42 formed of light reflex materials 12 (see FIG. 1) as plate-like optical elements as shown in FIG. 4 are combined into a lattice form to prepare a lattice frame 40 as shown in FIG. 5. As shown in FIG. 4, each strip 41 has slits 43 formed therein, while each strip 42 has slits 44 formed therein. That is, the lattice frame 40 is constructed with these slits combined together. The strips 41 and 42 correspond to the light reflex materials 12 shown in FIG. 1, and correspond to the optical elements in this invention. The preparation of this lattice frame 40 corresponds to step (1) in this invention.

The strips 41 and 42 may be contoured by any technique such as dicing, laser cutting, cutting with a cutting tool, etching or punching. The strips 41 and 42 are thin plates, and may therefore be cut easily and precisely.

Next, a receptacle 50 as shown in FIG. 9, which can accommodate the lattice frame 40 is made available for use. The receptacle 50 has a recess 51 for receiving the lattice frame 40 therein. The recess 51 has an area and depth large enough to enclose the lattice frame 40 completely. A release agent, for example, is applied to inner surfaces of the recess 51 beforehand for allowing a two-stage scintillator block in trial assembly 54 (see FIG. 9) or the two-stage scintillator block 1 as a finished product (see FIG. 1) to be removed easily from the recess 51. Preferably, the receptacle 50 is formed of a fluororesin having excellent release action, or a metal such as aluminum or stainless steel with fluororesin-coated surfaces.

Next, as shown in FIG. 7, a film 52 is laid along the recess 51 of the receptacle 50. The thickness of film 52 is so thin that it can be stored with the lattice frame 40 and can be bent. For example, a lumirror film of about 20-micrometer is preferred.

Further, as shown in FIG. 8, the lattice frame 40 is stored in the receptacle 50 so as to be nipped by the film 52 laid therein.

After the lattice frame 40 is stored, all the scintillators 1SF and scintillators 1SR are stored to form the two-stage scintillator block 54 in trial assembly 54 (see FIG. 9). The scintillators 1SF are stored after the scintillators 1SR, whereby the scintillators 1SR are placed on the side adjacent the photomultiplier tubes 31-34 which is the side reverse of the gamma ray incidence side, and the scintillators 1SF on the gamma ray incidence side.

In this state, as shown in FIG. 9, adhesive tape 53 is attached and fixed to the upper surface (gamma ray incidence plane) of the two-stage scintillator block in trial assembly 54. At the time of this attachment, as shown in FIG. 9, it is preferable to stick the adhesive tape 53 also to the film 52. The lattice frame 40, scintillators 1SF and scintillators 1SR in the state of trial assembly are once taken out of the receptacle 50 (see FIG. 8) along with the film 52 and adhesive tape 53. The two-stage scintillator block in trial assembly 54 shown in FIG. 9 is formed of the lattice frame 40, scintillators 1SF, scintillators 1SR, film 52 and adhesive tape 53 taken out. The process from the storage to the takeout of the lattice frame 40, scintillators 1SF and scintillators 1SR corresponds to step (2) in this invention.

Next, a completely degassed, optically transparent optical binding material is poured into the recess 51 of the receptacle 50. The optical adhesive preferably is a silicon-based adhesive, epoxide-based adhesive or the like. The pouring into the receptacle 50 of the optical binding material corresponds to step (3) in this invention.

The two-stage scintillator block in trial assembly 54 stored and fully sunk in the receptacle 50 having the optical binding material poured thereinto. When storing the two-stage scintillator block in trial assembly 54, the optical binding material may overflow the receptacle 50. The storing operation may be carried out while wiping it off from time to time. Subsequently, the adhesive tape 53 is stripped and removed from the upper surface of two-stage scintillator block in trial assembly 54, and only the film 52 is pulled out of the receptacle 50. Since the two-stage scintillator block in trial assembly 54 is already seated in the recess 51 at this time, its shaped can be maintained. Further, a transparent optical binding material is dripped from above to fill gaps between the scintillators 1SF and scintillators 1SR and the lattice frame 40 or gaps between the scintillators. Vacuum degassing is carried out along with the dripping, so that the dripped optical binding material may completely fill the gaps between the scintillators 1SF and scintillators 1SR and the lattice frame 40 or the gaps between the scintillators. The storage of the lattice frame 40 and scintillators 1SF and 1SR in the state of trial assembly (two-stage scintillator block in trial assembly 54) corresponds to step (4) in this invention.

After allowing the optical binding material to harden, the scintillators 1SF, scintillators 1SR, lattice frame 40 and optical binding material are integrated into the two-stage scintillator block 1 (see FIG. 1). After hardening, the two-stage scintillator block 1 is taken out of the receptacle 50. To adjust the contour, unnecessary parts of the optical binding material adhering to the outer peripheries are removed, thereby realizing the two-stage scintillator block 1 shown in FIG. 1. This takeout of the two-stage scintillator block 1 corresponds to step (5) in this invention.

The two-stage scintillator block 1 manufactured in this way is optically coupled to the light guide 20 as shown in FIG. 1, which are further optically coupled to the photomultiplier tubes 31-34 to manufacture the radiation detector 10.

According to the above method of manufacturing the radiation detector 10, the manufacture is carried out through the series of steps described above, and thus the optical elements (e.g. light reflex materials 12) can be arranged in the two-stage scintillator block 1 which is a group of scintillators, without cutting such as with a dicing saw or wire saw. The radiation detector can be realized simply with high processing accuracy. For example, even the scintillators 1SF and scintillators 1SR having a small sectional area are given high profile accuracy by the above manufacturing method. Since the lattice frame 40 is easy to form according to design, each of the scintillators 1SF and scintillators 1SR in the cubicles also is easy to form according to design. Therefore, gaps are not easily produced between the scintillators and the interposed light reflex materials 12. It is possible to improve discriminating performance and to maintain high image quality with high resolution.

The lattice frame 40 and scintillators 1SF and 1SR are stored in the receptacle 50. The lattice frame 40 and scintillators 1SF and 1SR in a state of trial assembly (i.e. the two-stage scintillator block in trial assembly 54) are once taken out of the receptacle 50. The shape of the lattice frame 40 is fixed by the scintillators 1SF and 1SR placed therein, and the shape of the lattice frame 40 and scintillators 1SF and 1SR is fixable in the state of trial assembly. The lattice frame 40 and scintillators 1SF and 1SR in the state of trial assembly are stored in the receptacle 50 into which the optical binding material has been poured. Thus, the shape is hardly deformable from the state of trial assembly. There is a reduced chance of trouble occurring with the manufacture of the two-stage scintillator block 1 which is a group of scintillators, and thus with the manufacture of the radiation detector 10. Thus, with little chance of trouble occurring in manufacture, the radiation detector 10 is realized simply.

In this embodiment, the lattice frame 40 is stored in the receptacle 50 so as to be nipped by the film 52. After the scintillators 1SF and 1SR are stored, the adhesive tape 53 is applied to the upper surface of the trial assembly. The lattice frame 40 and scintillators 1SF and 1SR are once taken out of the receptacle 50 along with the film 52 and adhesive tape 53 in the state of trial assembly. By taking them out in this way, the shape of the lattice frame 40 is fixed by the scintillators 1SF and 1SR stored therein. The shape of the lattice frame 40 is fixed also by the nipping action of the film 52. The shape of the lattice frame 40 is fixed by the adhesive tape 53 applied to the upper surface of the trial assembly. Therefore, the lattice frame 40 and scintillators 1SF and 1SR can be fixed in the state of trial assembly with increased stability. The lattice frame 40 and scintillators 1SF and 1SR in trial assembly are stored in the receptacle 50 along with the film 52 and adhesive tape 53, the adhesive tape 53 is removed from the upper surface before adhesion and hardening, and only the film 52 is pulled out of the receptacle 50. Through the storage described above, the shape is further stabilized in and hardly deformable from the state of trial assembly. There is a further reduced chance of trouble occurring with the manufacture of the two-stage scintillator block 1, and thus with the manufacture of the radiation detector 10.

When applying the adhesive tape 53 to the upper surface of the trial assembly, the adhesive tape 53 is applied also to the film 52. Thus, the film 52 can nip the lattice frame 40 with increased assurance.

In this embodiment, the optical binding material is dripped to fill gaps between the scintillators 1SF, 1SR and lattice frame 40, or gaps between the scintillators. The dripping can prevent voids forming in the gaps between the scintillators 1SF, 1SR and lattice frame 40 or gaps between scintillators, thus preventing lowering of resolution due to the voids.

In this embodiment, vacuum degassing is carried out while the optical binding material is dripped. The vacuum degassing can prevent voids forming in the hardened optical binding material, and can prevent lowering of resolution due to the voids. As a result, it is possible to improve discriminating performance and to maintain high image quality with high resolution.

In this embodiment, the lattice frame 40 is stored in the receptacle 50, and the scintillators 1SF and 1SR are stored in two separate steps in the direction of depth of gamma ray incidence. Specifically, after storing the scintillators 1SR first, the scintillators 1SF are stored. The total length (height) in the direction of depth of gamma ray incidence of scintillators 1SF and 1SR stored in two separate steps and the length in the direction of depth of gamma ray incidence of the lattice frame 40 are made equal, and the lattice frame 40 and scintillators 1SF and 1SR are once taken out of the receptacle 50 in the state of trial assembly. By manufacturing in this way, the radiation detector 10 is realized simply as having the two-stage scintillator block 1 divided into the scintillator array upper part 11F and scintillator array lower part 11R in the direction of depth of gamma ray incidence.

By storing the scintillators 1SF and 1SR in two separate steps in the direction of depth of gamma ray incidence, in the receptacle 50 having the lattice frame 40 stored therein, the scintillators 1SF and 1SR can be manufactured en bloc. Thus, the number of man-hours for assembly can be halved. Since there is no need to bond the scintillator array upper part 11F and scintillator array lower part 11R, mapping can be carried out accurately with no displacement occurring between the scintillators. As a result, it is possible to improve discriminating performance and to maintain high image quality with high resolution.

This invention relating to the method of manufacturing the radiation detector 10 is particularly useful for manufacturing the radiation detector 10 having the two-stage scintillator block 1 divided in the direction of depth of gamma ray incidence as in this embodiment. That is, in the prior art, when a lattice frame formed of optical elements which are film-like thin plates is stored in the receptacle 50 into which the optical binding material has been poured, the shape of the lattice frame is not fixed because of adjoining optical elements adhering to one another, for example. This causes trouble with manufacture of the group of scintillators, and thus manufacture of the radiation detector. Further, the number of man-hours for assembly corresponding to the number of divisions is required. This invention, when applied to the radiation detector 10 having the two-stage scintillator block 1 divided in the direction of depth of gamma ray incidence, produces outstanding effects of reducing the number of man-hours for assembly and reducing trouble occurring with the manufacture.

In this embodiment, the scintillators different in attenuation time are stored in two separate steps in the direction of depth of gamma ray incidence, so that the attenuation time of emission pulse generating from incident gamma rays may increase from the gamma ray incidence side toward the side adjacent the photomultiplier tubes 31-34. That is, the scintillators 1SF with a short attenuation time of emission pulse are stored on the gamma ray incidence side, while the scintillators 1SR with a short attenuation time of emission pulse are stored on the side adjacent the photomultiplier tubes 31-34 which is the side reverse of the gamma ray incidence side. By using the difference in the attenuation time of emission pulse in this way, gamma rays are captured in the direction of depth of gamma ray incidence, and positions of the gamma rays can be detected and determined with high accuracy.

This invention is not limited to the above embodiment, but may be modified as follows:

(1) This invention may be applied to a nuclear medicine diagnostic apparatus such as a PET apparatus or SPECT apparatus, and is applicable also to an apparatus combining a nuclear medicine diagnostic apparatus and an X-ray CT apparatus such as PET-CT which combines a PET apparatus and an X-ray CT apparatus. It is not limited to a medical diagnostic apparatus such as a nuclear medicine diagnostic apparatus, but may be applied to a radiographic apparatus for industrial use.

(2) In the foregoing embodiment, the radiation detector is constructed for detecting gamma rays. The invention is applicable also to a detector for detecting radiation other than gamma rays, e.g. X rays.

(3) In the foregoing embodiment, the light-sensitive elements have been described as photomultiplier tubes 31-34. It is possible to use other light-sensitive elements such as photodiodes or avalanche photodiodes, for example.

(4) In the foregoing embodiment, when applying the adhesive tape 53 to the upper surface of the trial assembly, the adhesive tape 53 is applied also to the film 52. It may be applied only to the upper surface of the trial assembly, and not to the film 52. When nipping the lattice frame 40 more firmly with the film 52 is considered, it is preferable to apply the adhesive tape 53 also to the film 52 as in the embodiment.

(5) In the foregoing embodiment, the lattice frame 40 is stored in the receptacle 50 so as to be nipped by the film 52, the scintillators 1SF and 1SR are stored, then the adhesive tape 53 is applied to the upper surface of the trial assembly, the lattice frame 40 and scintillators 1SF and 1SR in the state of trial assembly are once taken out of the receptacle 50 along with the film 52 and adhesive tape 53, the lattice frame 40 and scintillators 1SF and 1SR in the state of trial assembly are stored in the receptacle 50 along with the film 52 and adhesive tape 53, the adhesive tape 53 is removed from the upper surface before adhesion and hardening, and only the film 52 is pulled out of the receptacle 50. However, the adhesive tape 53 is not absolutely necessary. That is, the lattice frame 40 may be stored in the receptacle 50 so as to be nipped by the film 52, the scintillators 1SF and 1SR may be stored, the lattice frame 40 and scintillators 1SF and 1SR in the state of trial assembly may once be taken out of the receptacle 50 along with the film 52, the lattice frame 40 and scintillators 1SF and 1SR in the state of trial assembly may be stored in the receptacle 50 along with the film 52, and only the film 52 may be pulled out of the receptacle 50 before adhesion and hardening. It is preferable to use the adhesive tape 53 as in the embodiment, considering that the shape is further stabilized in and hardly deformable from the state of trial assembly, resulting in a further reduced chance of trouble occurring with the manufacture of the two-stage scintillator block 1, and thus with the manufacture of the radiation detector 10.

(6) In the foregoing embodiment, the film 52 is laid along the recess 51 of the receptacle 50, the lattice frame 40 is stored in the receptacle 50 so as to be nipped by the film 52 laid therein, the scintillators 1SF and 1SR are stored, the lattice frame 40 and scintillators 1SF and 1SR in the state of trial assembly are once taken out of the receptacle 50 along with the film 52, the lattice frame 40 and scintillators 1SF and 1SR in the state of trial assembly are stored in the receptacle 50 along with the film 52, and only the film 52 is pulled out of the receptacle 50 before adhesion and hardening. However, the film 52 is not absolutely necessary. That is, the lattice frame 40 may be stored in the receptacle 50, the scintillators 1SF and 1SR may also be stored, the lattice frame 40 and scintillators 1SF and 1SR in the state of trial assembly may once be taken out of the receptacle 50, and the lattice frame 40 and scintillators 1SF and 1SR in the state of trial assembly may be stored in the receptacle 50. It is preferable to use the film 52 as in the embodiment, considering that the shape is further stabilized in and hardly deformable from the state of trial assembly, resulting in a further reduced chance of trouble occurring with the manufacture of the two-stage scintillator block 1, and thus with the manufacture of the radiation detector 10.

(7) In the foregoing embodiment, as shown in FIGS. 7 and 8, the film 52 is laid along one plane (YZ plane in FIG. 1) of the recess 51 to nip the lattice frame 40 and scintillators 1SF and 1SR from only one direction (X-direction in FIG. 1). The film 52 may be laid along one plane (YZ plane in FIG. 1) of the recess 51 and may be laid along another plane (ZX plane in FIG. 1) to nip the lattice frame 40 and scintillators 1SF and 1SR from two directions (X- and Y-directions in FIG. 1). The nipping from the two directions further stabilizes the shape from the state of trial assembly.

(8) In the foregoing embodiment, vacuum degassing is carried out while the optical binding material is dripped. However, the degassing is not absolutely necessary. The dripping of the optical binding material is not absolutely necessary, either.

(9) The foregoing embodiment has been described taking, for example, the radiation detector 10 having the two-stage scintillator block 1 divided in the direction of depth of gamma ray incidence. The divided stages are not limited to two stages. The invention may be applied to a radiation detector having a scintillator block divided into three or more stages (i.e. a DOI detector). In this case, a DOI detector is obtained by storing the lattice frame in the receptacle, storing each of scintillators in a plurality of separate steps in the direction of depth of gamma ray incidence, so that a total length (height) in the direction of depth of gamma ray incidence of the scintillators stored in the plurality of separate steps equals the length in the direction of depth of gamma ray incidence of the lattice frame, and taking the lattice frame and scintillators once out of the receptacle in a state of trial assembly. Further, the number of scintillators constituting each of the scintillator array upper part 11F and scintillator array lower part 11R has been described as 8×8, but this number may be varied.

(10) In the foregoing embodiment, the scintillators different in attenuation time are stored in a plurality of (two in the embodiment) separate steps in the direction of depth of gamma ray incidence, so that the attenuation time of emission pulse generating from incident gamma rays may increase from the gamma ray incidence side toward the side adjacent the photomultiplier tubes 31-34. Instead, scintillators of the same attenuation time may be stored in a plurality of separate steps in the direction of depth of gamma ray incidence.

(11) This invention is applied to a radiation detector having a scintillator block with a plurality of stages (two stages in the embodiment) divided in the direction of depth of gamma ray incidence (i.e. a DOI detector). The invention may be applied to a radiation detector having a scintillator block not divided in the direction of depth of gamma ray incidence. A radiation detector having a scintillator block with a plurality of stages divided in the direction of depth of gamma ray incidence may be manufactured by combination with a conventional manufacturing method which stacks a plurality of scintillator blocks with an optical adhesive interposed in between.

INDUSTRIAL UTILITY

As described above, this invention is suitable for a radiographic apparatus for medical or industrial use.

The invention claimed is:

1. A method of manufacturing a radiation detector including scintillator groups having a plurality of scintillators in a two-dimensional close arrangement, a light guide optically coupled to the scintillator group, and a plurality of light-sensitive elements optically coupled to the light guide and smaller in number than the scintillator groups, said method comprising (1) a step of preparing a lattice frame by combining a plurality of plate-like optical elements into a lattice form; (2) a step of storing the lattice frame in a receptacle capable of storing the lattice frame, and further storing scintillators, to form a trial assembly, and taking the lattice frame and the scintillators once out of the receptacle in the state of trial assembly; (3) a step of pouring an optical binding material into the receptacle before storing the lattice frame and scintillators in the trial assembly in the receptacle; (4) a step of storing, the lattice frame and the scintillators in the trial assembly in the receptacle; (5) a step of allowing for adhesion and hardening in this state, and (6) a step of taking out of the receptacle a scintillator block integrating the optical binding material hardened, the lattice frame and the scintillators, and adjusting a contour thereof to complete the scintillator block.

2. The method of manufacturing a radiation detector according to claim 1, wherein, before step (2) above, a film is laid along a recess of the receptacle for storing the lattice frame; step (2) above is executed to store the lattice frame in the receptacle so as to be nipped by the film laid therein, store the scintillators, and take the lattice frame and the scintillators once out of the receptacle in the state of trial assembly along with the film; step (4) above is executed to store the lattice frame and the scintillators in the trial assembly in the receptacle along with the film, and before step (5) above, only the film is pulled out of the receptacle.

3. The method of manufacturing a radiation detector according to claim 2, wherein step (2) above is executed to store the lattice frame in the receptacle so as to he nipped by the film laid therein, store the scintillators, then apply an adhesive tape to an tipper surface of the trial assembly, and take the lattice frame and the scintiilators once out of the receptacle in the state of Thai assembly along with the film and the adhesive tape; step (4) above is executed to store the lattice frame and the scintillators in the trial assembly in the receptacle along with the film and the adhesive tape, and before step (5) above, the adhesive tape is removed from the upper surface and only the film is pulled out of the receptacle.

4. The method of manufacturing a radiation detector according to claim 3 wherein step (2) above is executed to apply the adhesive tape also to the film when applying the adhesive tape to the upper surface of the trial assembly.

5. The method of manufacturing a radiation detector according to claim 1, wherein step (4) above is executed to drip an optical binding material to fill gaps between the scintillators and the lattice frame and gaps between the scintillators after storing the lattice frame and the scintillators in the trial assembly in the receptacle.

6. The method of manufacturing a radiation detector according to claim 5, wherein vacuum degassing is carried out while dripping the optical binding material.

7. The method of manufacturing a radiation detector according to claim 1, wherein a length in a direction of depth of radiation incidence of the scintillators to be stored in step (2) above is made shorter than a length in the direction of depth of radiation incidence of the lattice frame; and step (2) above is executed to store the lattice frame in the receptacle, store the respective scintillators as divided into a plurality in the direction of depth of radiation incidence equalize a total length in the direction of depth of radiation incidence of the scintillators stored as divided into the plurality and the length in the direction of depth of radiation incidence of the lattice frame, and take the lattice frame and the scintillators once out of the receptacle in the state of trial assembly.

8. The method of manufacturing a radiation detector according to claim 7, wherein the respective scintillators different in attenuation time are stored as divided into the plurality in the direction of depth of radiation incidence, so that an attenuation time of emission pulse generating from incident radiation increase from a radiation incidence side toward a side adjacent the light-sensitive elements.

9. The method of manufacturing a radiation detector according to claim 7, wherein step (2) above is executed to store the lattice frame in the receptacle, store the respective scintillators in two separate steps in the direction of depth of radiation incidence, equalize a total length in the direction of depth of radiation incidence of the scintillators stored in the two separate steps and the length in the direction of depth of radiation incidence of the lattice frame, and take the lattice frame and the scintillators once out of the receptacle in the state of trial assembly.

10. The method of manufacturing a radiation detector according to claim 9, wherein, in connection with an attenuation time of emission pulse generating from incident radiation, the scintillators with a shorter attenuation on time are stored on a radiation incidence side, while the scintillators with a longer attenuation time are stored on a side adjacent the light-sensitive elements which is a side reverse of the radiation incidence side.

* * * * *